(12) United States Patent
Heo et al.

(10) Patent No.: US 9,146,880 B2
(45) Date of Patent: Sep. 29, 2015

(54) SYSTEM-ON-CHIP FOR PROVIDING ACCESS TO SHARED MEMORY VIA CHIP-TO-CHIP LINK, OPERATION METHOD OF THE SAME, AND ELECTRONIC SYSTEM INCLUDING THE SAME

(71) Applicant: SAMSUNG ELECTRONICS CO., LTD., Suwon-si, Gyeonggi-do (KR)

(72) Inventors: Jung-hun Heo, Hwaseong-si (KR); Jae-youl Kim, Hwaseong-si (KR); Jae-gon Lee, Hwaseong-si (KR); Nam-phil Jo, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 315 days.

(21) Appl. No.: 13/895,606

(22) Filed: May 16, 2013

(65) Prior Publication Data

US 2013/0318311 A1 Nov. 28, 2013

(30) Foreign Application Priority Data

May 16, 2012 (KR) .......................... 10-2012-0052087

(51) Int. Cl.
*G06F 12/14* (2006.01)
*G06F 13/16* (2006.01)
*G06F 3/06* (2006.01)
*G06F 1/32* (2006.01)

(52) U.S. Cl.
CPC .............. *G06F 12/14* (2013.01); *G06F 1/3253* (2013.01); *G06F 1/3275* (2013.01); *G06F 3/0655* (2013.01); *G06F 13/1663* (2013.01); *G06F 13/1668* (2013.01); *G06F 2213/0038* (2013.01); *Y02B 60/1225* (2013.01); *Y02B 60/1228* (2013.01); *Y02B 60/1235* (2013.01); *Y02B 60/32* (2013.01)

(58) Field of Classification Search
CPC . G06F 3/0655; G06F 13/1663; G06F 1/3203; G06F 1/3253; G06F 1/3275; G06F 1/3287; G06F 2213/0038
See application file for complete search history.

(56) References Cited

U.S. PATENT DOCUMENTS

| | | | |
|---|---|---|---|
| 6,650,594 | B1 | 11/2003 | Lee et al. |
| 7,366,862 | B2 | 4/2008 | Nystuen et al. |
| 7,437,500 | B2 | 10/2008 | Butt et al. |
| 7,975,164 | B2 | 7/2011 | Lee et al. |
| 2010/0007770 | A1 | 1/2010 | Koganezawa et al. |
| 2011/0145492 | A1 | 6/2011 | Macri et al. |

(Continued)

FOREIGN PATENT DOCUMENTS

| | | |
|---|---|---|
| JP | 2006065470 | 3/2006 |
| KR | 1020040007203 | 1/2004 |

*Primary Examiner* — John Lane
(74) *Attorney, Agent, or Firm* — F. Chau & Associates, LLC (57) ABSTRACT

An electronic system including a system-on-chip (SoC) providing access to a shared memory via a chip-to-chip link includes a memory device, a first semiconductor device, and a second semiconductor device. The first semiconductor device includes a first central processing unit (CPU) and a memory access path configured to enable access to the memory device. The second semiconductor device is configured to access the memory device via the memory access path of the first semiconductor device. The second semiconductor device is permitted to access the memory device while the memory access path is active and the first CPU is inactive, and the memory access path is configured to become active without intervention of the first CPU.

2 Claims, 11 Drawing Sheets

(56) References Cited

U.S. PATENT DOCUMENTS

2011/0179220 A1 7/2011 Vink
2011/0246713 A1 10/2011 Bains
2012/0300570 A1* 11/2012 Kim et al. .................. 365/222

* cited by examiner

SYSTEM-ON-CHIP FOR PROVIDING ACCESS TO SHARED MEMORY VIA CHIP-TO-CHIP LINK, OPERATION METHOD OF THE SAME, AND ELECTRONIC SYSTEM INCLUDING THE SAME

CROSS-REFERENCE TO RELATED APPLICATIONS

This application claims priority under 35 U.S.C. §119(a) from Korean Patent Application No. 10-2012-0052087, filed on May 16, 2012, the disclosure of which is hereby incorporated by reference in its entirety.

TECHNICAL FIELD

Exemplary embodiments of the inventive concept relate to a system-on-chip (SoC), and more particularly, to a SoC for providing access to a shared memory via a chip-to-chip link, an operation method of the same, and an electronic system including the same.

DISCUSSION OF THE RELATED ART

In certain electronic systems, at least two chips may share a single memory with each other. For example, in an electronic system, a memory may be connected to a first chip, and a second chip may access the memory via the first chip. In this system, the first chip remains active (e.g., in a power-on state) to enable the second chip to access the memory. However, indefinitely keeping the first chip in the power-on state to allow the second chip to access the memory results in increased power consumption.

Further, if the first chips is inactive (e.g., in a power-off state), and the second chip requests access to the memory, the first chip must switch to an active state, which requires a certain amount of time, resulting in a decrease in response speed.

SUMMARY

According to exemplary embodiments of the inventive concept, an electronic system includes a memory device, a first semiconductor device including a central processing unit (CPU) and a memory access path enabling access to the memory device, and a second semiconductor device configured to access the memory device via the memory access path of the first semiconductor device.

When the CPU of the first semiconductor device is inactive, the memory access path may become active without intervention of the CPU to allow the second semiconductor device to access the memory device.

According to exemplary embodiments of the inventive concept, a system-on-chip (SoC) connected with an external semiconductor device and a memory device includes a CPU and a memory access path configured to allow the external semiconductor device to access the memory device.

The CPU and the memory access path may be selectively powered on or off. When the CPU is inactive, the memory access path may become active without intervention of the CPU so that the external semiconductor device accesses the memory device.

According to exemplary embodiments of the inventive concept, there is provided an operation method of an electronic system including a memory device, a first semiconductor device accessing the memory device, and a second semiconductor device accessing the memory device via the first semiconductor device. The operation method includes powering off the first semiconductor device except a memory access path, through which the second semiconductor device accesses the memory device, in a state where the first and second semiconductor devices are active, the second semiconductor device disconnecting an interface with the first semiconductor device, powering off a memory interface of the first semiconductor device, the second semiconductor device requesting the first semiconductor device to connect the interface, powering on the memory access path without intervention of a central processing unit in a state where the first semiconductor device except the memory access path is powered off, a physical interface controller applying a locking start signal for starting delay-locked loop (DLL) locking to a physical interface, enabling the interface with the second semiconductor device when the DLL locking is completed in response to the locking start signal, and sending the second semiconductor device a response to the interface connection request.

According to exemplary embodiments of the inventive concept, there is provided an operation method of a semiconductor device connected to a memory device and to a remote semiconductor device which accesses the memory device via the semiconductor device. The operation method includes receiving an interface connection request from the remote semiconductor device in a state where the semiconductor device is inactive, starting delay-locked loop (DLL) locking to generate a clock signal necessary for an interface with the memory device in a state where a central processing unit (CPU) of the semiconductor device is inactive, and sending the remote semiconductor device a response to the interface connection request when the DLL locking is completed.

In the state where the CPU of the semiconductor device is inactive, a memory access path, through which the remote semiconductor device accesses the memory device, may be powered on.

According to an exemplary embodiment of the inventive concept, an electronic system includes a memory device, a first semiconductor device including a first central processing unit (CPU) and a memory access path configured to enable access to the memory device, and a second semiconductor device configured to access the memory device via the memory access path of the first semiconductor device. The second semiconductor device is permitted to access the memory device while the memory access path is active and the first CPU is inactive, and the memory access path is configured to become active without intervention of the first CPU.

According to an exemplary embodiment of the inventive concept, a semiconductor device includes a central processing unit (CPU) and a memory access path. The memory access path is connected to a memory device, is configured to enable access to the memory device by another semiconductor device while the memory access path is in an active state and the CPU is in an inactive state, and is configured to enter the active state without intervention of the CPU.

According to an exemplary embodiment of the inventive concept, a method of providing access to a shared memory includes powering off a set of components of a first semiconductor device except for a subset of the set of components forming a memory access path while the first semiconductor device and a second semiconductor device are active, wherein the memory access path is a path through which the second semiconductor device accesses a memory device via the first semiconductor device, disconnecting an interface between the first and second semiconductor devices upon the second semiconductor device becoming inactive while the first semiconductor device is inactive, sending an interface connection request, from the second semiconductor device to the first semiconductor device, to connect the interface upon the second semiconductor device becoming active, powering on the memory access path without intervention of a central processing unit while the set of components of the first semiconductor device except for the subset of the set of components forming the memory access path are powered off, applying a locking start control signal configured to start delay-locked loop (DLL) locking to a physical interface in the memory access path, enabling the interface between the first and second semiconductor devices upon completion of the DLL locking in response to the locking start control signal, and sending a response to the second semiconductor device in response to the interface connection request.

According to an exemplary embodiment of the inventive concept, a method of providing access to a shared memory device includes receiving an interface connection request from a first semiconductor device while a second semiconductor device is in an inactive state, starting delay-locked loop (DLL) locking to generate a clock signal used to interface with the shared memory device while a central processing unit (CPU) of the second semiconductor device is inactive, and sending the first semiconductor device a response to the interface connection request upon completion of the DLL locking.

BRIEF DESCRIPTION OF THE DRAWINGS

The above and other features of the inventive concept will become more apparent by describing in detail exemplary embodiments thereof with reference to the accompanying drawings, in which.

DETAILED DESCRIPTION OF THE EXEMPLARY EMBODIMENTS

Exemplary embodiments of the present inventive concept will be described more fully hereinafter with reference to the accompanying drawings. Like reference numerals may refer to like elements throughout the accompanying drawings.

It will be understood that when an element is referred to as being "connected" or "coupled" to another element, it can be directly connected or coupled to the other element or intervening elements may be present.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

Figure 1:
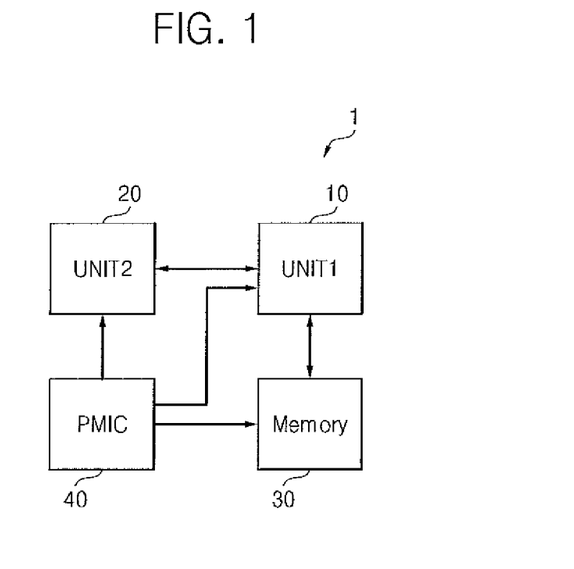
FIG. 1 is a block diagram of an electronic system, according to an exemplary embodiment of the inventive concept.

FIG. 1 is a block diagram of an electronic system 1 according to an exemplary embodiment of the inventive concept. The electronic system 1 includes a first semiconductor device 10, a second semiconductor device 20, a shared memory device 30, and a power unit 40.

The first semiconductor device 10 may be a system processor of the electronic system 1. The first semiconductor device 10 includes a memory interface configured to access the shared memory device 30. The first semiconductor device 10 can directly access the shared memory device 30.

The second semiconductor device 20 accesses the shared memory device 30 via the first semiconductor device 10. For example, the second semiconductor device 20 may not include a built-in memory, and may share the shared memory device 30 connected to the first semiconductor device 10.

The power unit 40 supplies power to the first and second semiconductor devices 10 and 20 and the shared memory device 30.

In addition to the elements 10 through 40 illustrated in FIG. 1, the electronic system 1 may include, for example, an input device, a clock unit, and/or an output device. The input device may be, for example, a keypad, a button, or a touch screen. The output device may be, for example, a display or an audio output unit.

The electronic system 1 may be, for example, a mobile device, a handheld device, or a handheld computer, such as a mobile phone, a smart phone, a tablet personal computer (PC), a personal digital assistant (PDA), a portable multimedia player (PMP), an MP3 player, or an automotive navigation system, however the electronic system 1 is not limited thereto.

The first semiconductor device 10 may be implemented using a system-on-chip (SoC), for example, an application processor. The second semiconductor device 20 may be, for example, a network device such as a modem, however the second semiconductor device 20 is not limited thereto.

Figure 2:
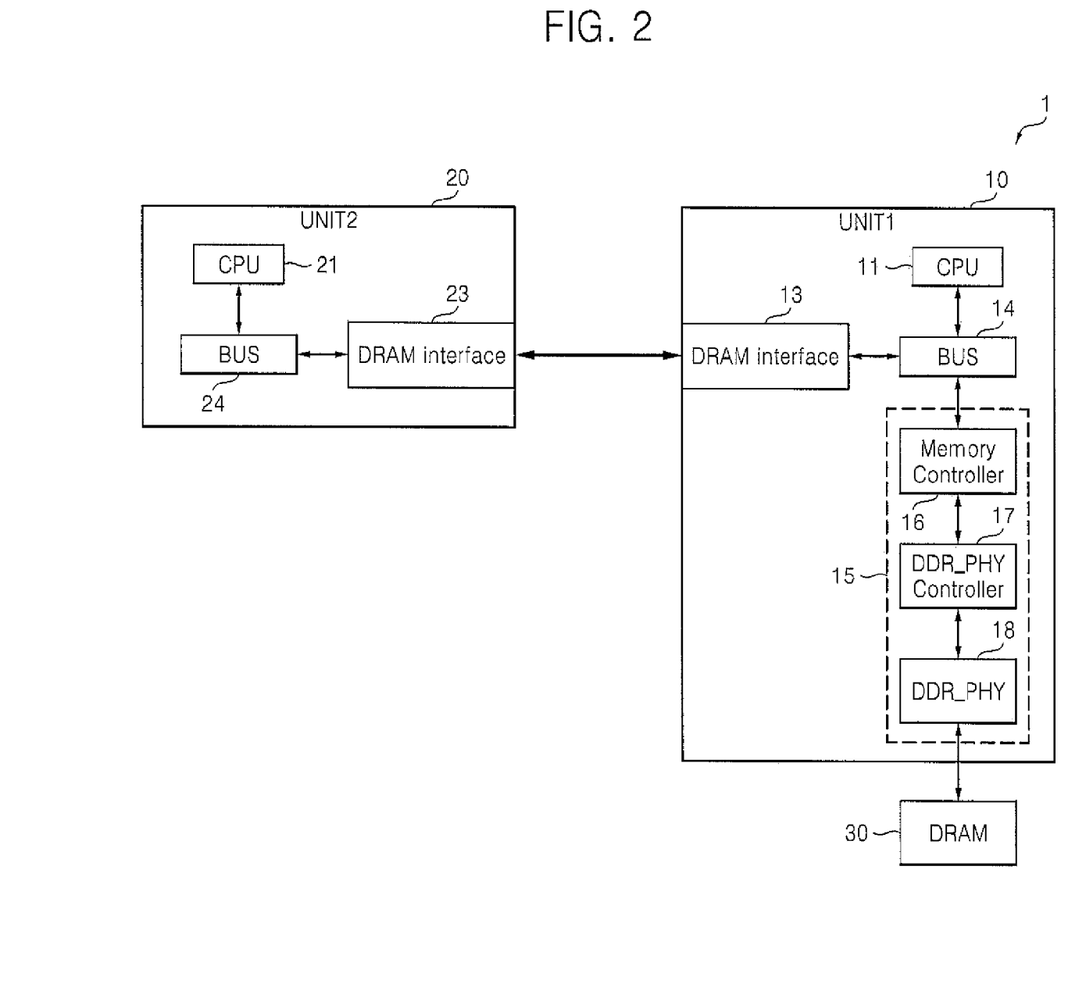
FIG. 2 is a schematic structural block diagram of a first semiconductor device and a second semiconductor device illustrated in FIG. 1, according to an exemplary embodiment of the inventive concept.

FIG. 2 is a schematic structural block diagram of the first semiconductor device 10 and the second semiconductor device 20 illustrated in FIG. 1, according to an exemplary embodiment. The first semiconductor device 10 includes a central processing unit (CPU) 11, a first device interface 13 configured to interface with the second semiconductor device 20, a first bus 14, and a memory interface 15 configured to access the memory device 30.

The CPU 11 may control the overall operation of the first semiconductor device 10. The first device interface 13 is a functional block configured to interface with the second semiconductor device 20. The first device interface 13 may interface with the second semiconductor device 20 via a second device interface 23 disposed in the second semiconductor device 20. Although the first and second semiconductor devices 13 and 23 are illustrated as being dynamic random access memory (DRAM) interfaces, and the memory device 30 is illustrated as being DRAM, exemplary embodiments are not limited thereto. The first bus 14 connects the first device interface 13 with the CPU 11 and a memory controller 16 of the memory interface 15 in the first semiconductor device 10.

The memory interface 15 includes the memory controller 16, a physical interface controller 17, and a physical interface 18. The memory controller 16 controls the operation of the memory device 30. The physical interface 18 controls the timing of a signal transferred between the memory device 30 and the memory controller 16 according to the control of the memory controller 16. The physical interface controller 17 controls the delay-locked loop (DLL) operation of the physical interface 18 in response to the interface connection request of the second semiconductor device 20. In an exemplary embodiment, the physical interface controller 17 controls the DLL operation without intervention of the CPU 11.

The second semiconductor device 20 includes a CPU 21, the second device interface 23, and a second bus 24. The CPU 21 may control the overall operation of the second semiconductor device 20. The second device interface 23 is a functional block configured to interface with the first semiconductor device 10 via the first device interface 13. The second bus 24 connects the second device interface 23 with the CPU 21 in the second semiconductor device 20.

In an exemplary embodiment, the memory device 30 may be synchronous dynamic random access memory (SDRAM), however the memory device 30 is not limited thereto. When the memory device 30 is SDRAM, the physical interface 18 may be a double data rate (DDR) physical interface. The first device interface 13 and the second device interface 23 may interface with each other according to a DRAM interface.

Figure 3:
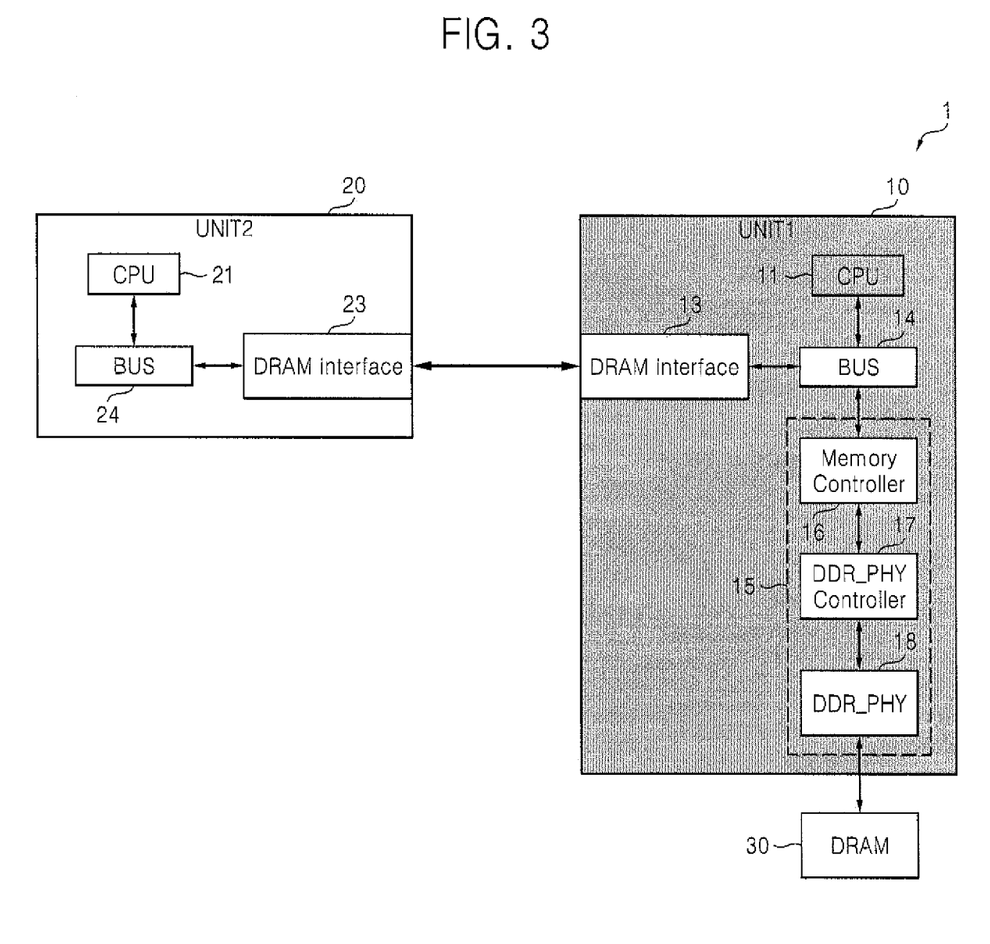
FIG. 3 is a diagram illustrating the operation of the electronic system while the first semiconductor device is inactive, according to an exemplary embodiment of the inventive concept.

FIG. 3 is a diagram illustrating the operation of the electronic system 1 while the first semiconductor device 10 is inactive, according to an exemplary embodiment. Referring to FIG. 3, the first semiconductor device 10 may enter a power-down mode under a predetermined condition in order to reduce power consumption. The predetermined condition may be, for example, a case where no user input is received during a predetermined period of time, however the predetermined condition is not limited thereto. While in the power-down mode, the CPU 11 of the first semiconductor device 10 is inactive. However, when the second semiconductor device 20 is in an active state, the memory access path of the first semiconductor device 10 is in a power-on state, which allows the second semiconductor device 20 to access the shared memory (e.g., the memory device 30) via the first semiconductor device 10, even while the CPU 11 of the first semiconductor device 10 is inactive. The memory access path is a path in the first semiconductor device 10 through which the second semiconductor device 20 accesses the memory device 30. The memory access path may include the first device interface 13, the first bus 14, and the memory interface 15, as illustrated in FIG. 1

When the second semiconductor device 20 is active while the first semiconductor device 10 is inactive, as illustrated in FIG. 3, only the first device interface 13, the first bus 14, and the memory interface 15 are in the power-on state (e.g., the active state) in the first semiconductor device 10, and the CPU 11 is in a power-off state (e.g., the inactive state).

Figure 4:
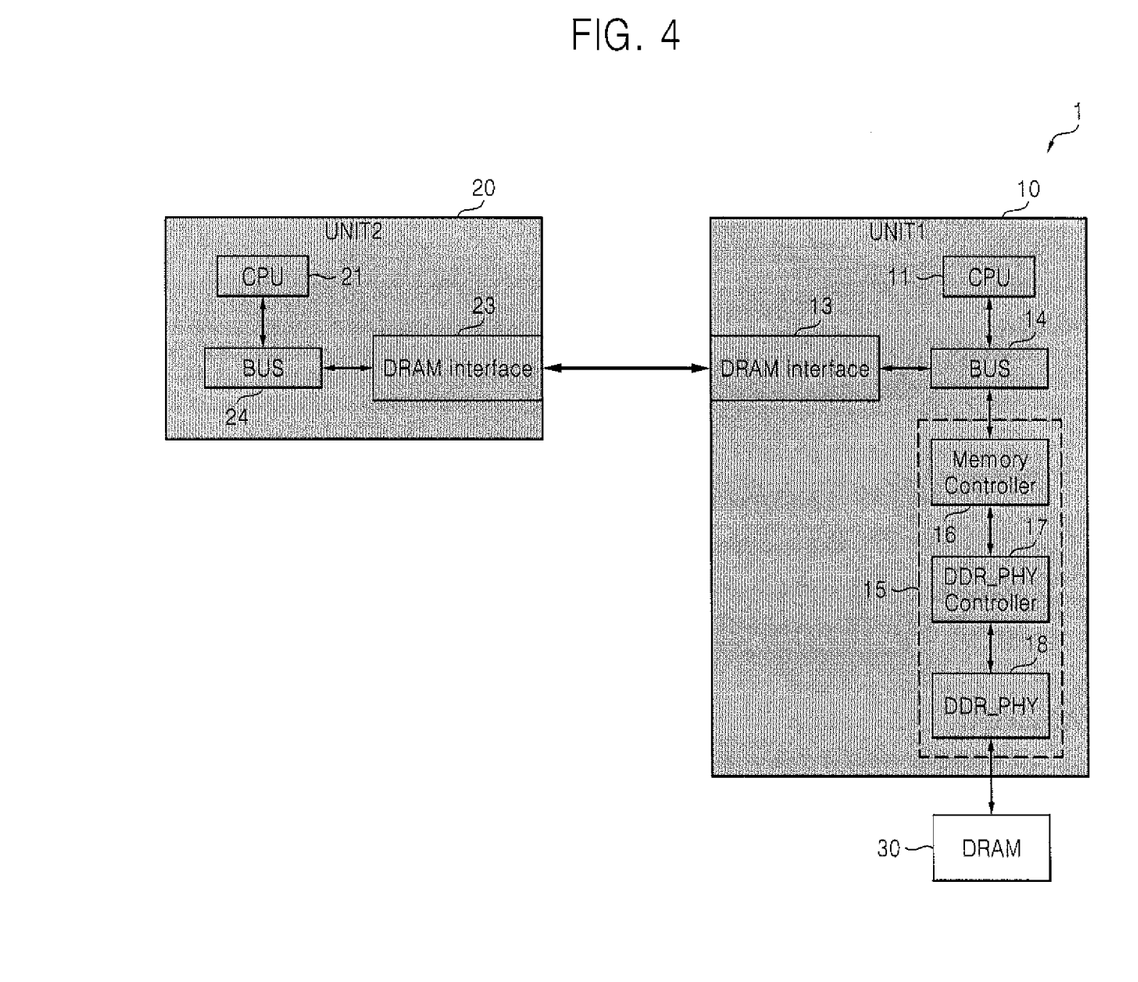
FIG. 4 is a diagram illustrating a state in which both the first and second semiconductor devices are inactive, according to an exemplary embodiment of the inventive concept.

FIG. 4 is a diagram illustrating a state in which both the first and second semiconductor devices 10 and 20 are inactive. When the second semiconductor device 20 becomes inactive while the first semiconductor device 10 is inactive, the first device interface 13 of the first semiconductor device 10 is disconnected from the second device interface 23 of the second semiconductor device 20. In addition, the memory access path of the first semiconductor device 10 is deactivated (e.g., the first device interface 13, the first bus 14, and the memory interface 15 are powered off).

When the second semiconductor device 20 transitions from the inactive state to the active state, only the memory access path of the first semiconductor device 10 is powered on within the first semiconductor device 10, which allows the second semiconductor device 20 to access the memory device 30 without powering on the entire first semiconductor device 10. For example, since the second semiconductor device 20 may repeatedly switch between the active state and the inactive state while the first semiconductor device 10 is in the inactive state, the first semiconductor device 10 may repeatedly power on or off only the memory access path according to the state of the second semiconductor device 20 without powering on all of its elements. Referring to FIGS. 2 and 3, although the CPU 11 is the only element of the first semiconductor device 10 shown as being powered off during the inactive state, exemplary embodiments are not limited thereto. For example, according to exemplary embodiments, while in the inactive state, only the elements in the memory access path of the first semiconductor device 10 are powered on, and all other elements that are not a part of the memory access path are powered off. That is, a subset of the set of elements in the first semiconductor device 10, the subset forming the memory access path, may be powered on while all other elements of the first semiconductor device 10 are powered off.

As described above, when the second semiconductor device 20 becomes active while the CPU 11 of the first semiconductor device 10 is inactive, only the memory access path including the elements 13, 14, and 15 becomes active without intervention of the CPU 11 to allow the second semiconductor device 20 to access the memory device 30 via the first semiconductor device 10.

Figure 5:
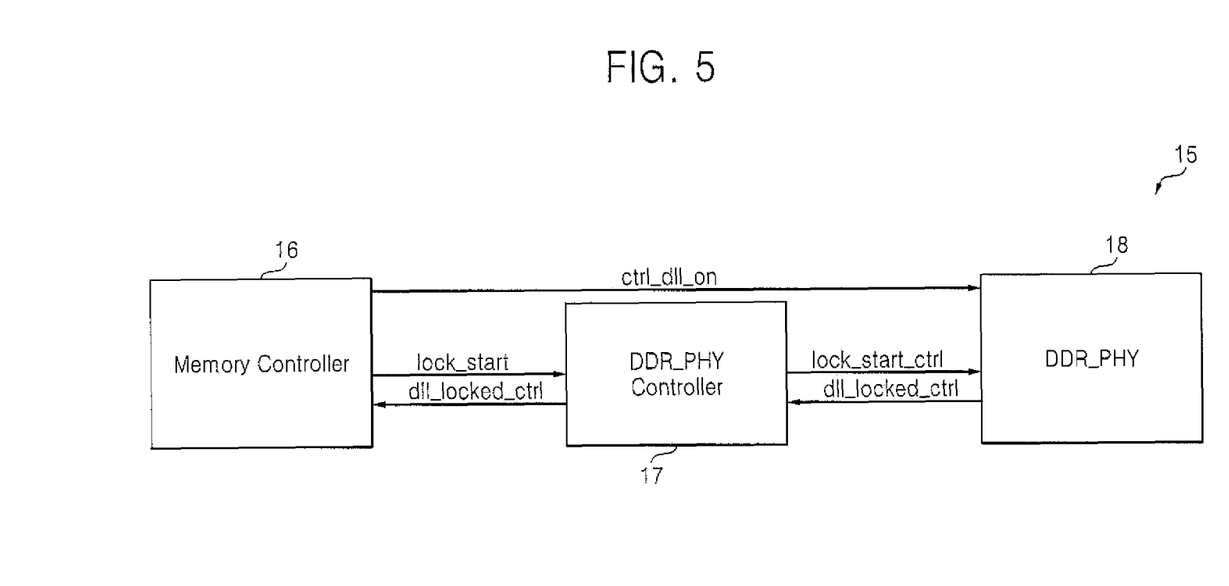
FIG. 5 is a structural block diagram of a memory interface illustrated in FIG. 2, according to an exemplary embodiment of the inventive concept.

FIG. 5 is a structural block diagram of the memory interface 15 illustrated in FIG. 2 according to an exemplary embodiment of the inventive concept. The memory interface 15 includes the memory controller 16, the physical interface controller 17, and the physical interface 18. The memory controller 16 controls the memory device 30. The physical interface 18 controls the timing of a signal transferred between the memory device 30 and the memory controller 16 according to the control of the memory controller 16. The physical interface 18 includes a DLL that controls the timing.

The physical interface controller 17 controls the locking operation of the DLL of the physical interface 18 in response to the interface connection request of the second semiconductor device 20. For example, the physical interface controller 17 controls the operation of the DLL without intervention of the CPU 11.

Figure 6:
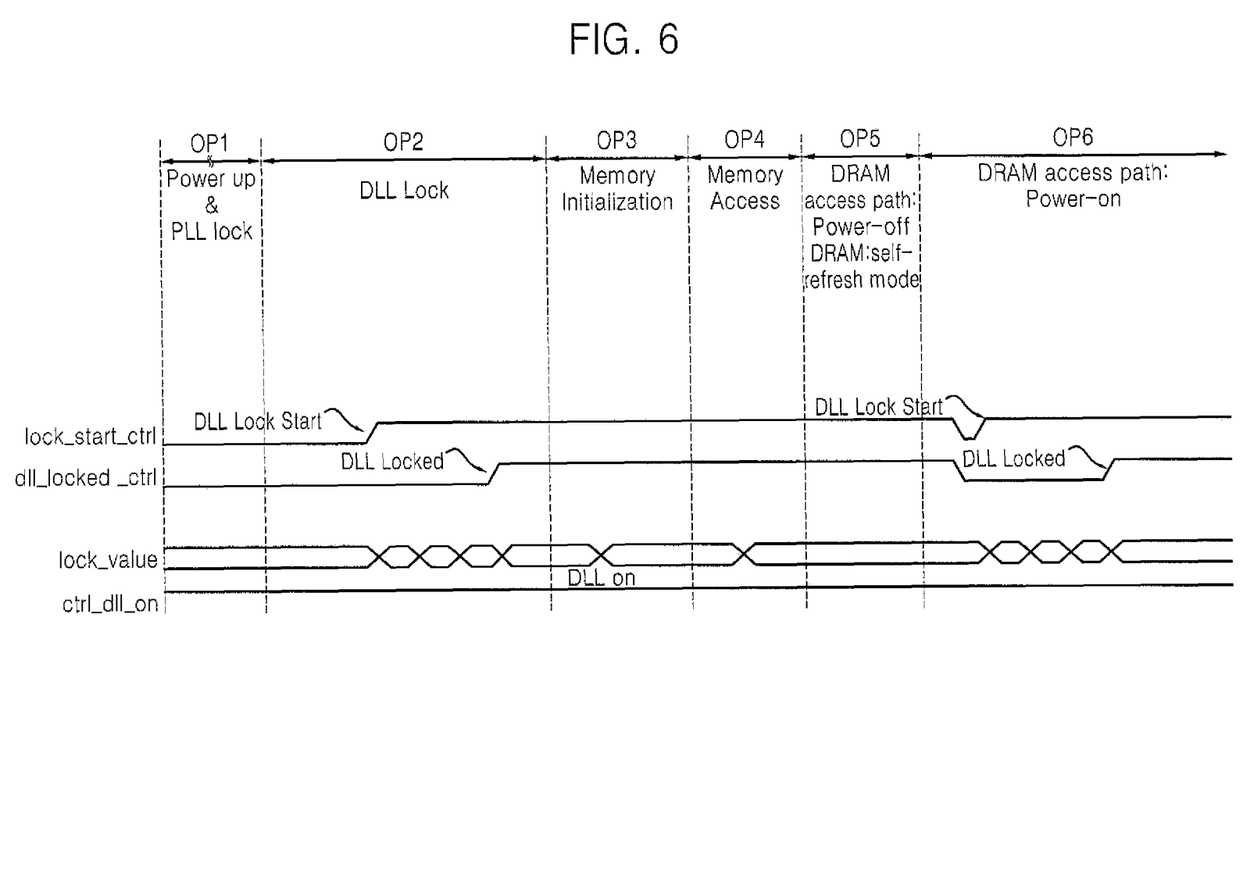
FIG. 6 is a timing chart showing a delay-locked loop (DLL) control operation, according to an exemplary embodiment of the inventive concept.

FIG. 6 is a timing chart showing a DLL control operation according to an exemplary embodiment. In a first operation period OP1, the first semiconductor device 10 is powered up and a phase-locked loop (PLL) operates. A DLL locking enabling signal ctrl_dll_on is transmitted from the memory controller 16 to the physical interface 18, enabling DLL. In a second operation period OP2, the locking operation of the DLL is carried out. To start the locking operation of the DLL, the memory controller 16 applies a locking start signal lock_start to the physical interface controller 17. In response to the locking start signal lock_start, the physical interface controller 17 applies a locking start control signal lock_start_ctrl to the physical interface 18. In response to the locking start control signal lock_start_ctrl, the DLL of the physical interface 18 may start the locking operation. As the locking operation starts, a locking value lock_value is generated in the physical interface 18. When the locking operation of the DLL is completed after a predetermined period of time, the physical interface 18 sends the physical interface controller 17 a DLL locking completion signal dll_locked_ctrl indicating that the locking operation of the DLL has been completed. The physical interface controller 17 transmits the DLL locking completion signal dll_locked_ctrl to the memory controller 16. When the locking operation of the DLL is completed, a third operation period OP3 starts. In the third operation period OP3, the memory device 30 is initialized. When the initialization of the memory device 30 is completed, memory access is carried out in a fourth operation period OP4.

In a fifth operation period OP5, the memory access path including the first device interface 13, the first bus 14, and the memory interface 15 is powered off, as shown in FIG. 4. At this time, the memory device 30 operates in a self-refresh mode. In a sixth operation period OP6, only the memory access path including the first device interface 13, the first bus 14, and the memory interface 15 becomes active in the first semiconductor device 10 while the CPU 11 remains inactive, as shown in FIG. 3.

In the sixth operation period OP6, the physical interface controller 17 applies the locking start control signal lock_start_ctrl to the physical interface 18 to start the locking operation of the DLL of the physical interface 18. At this time, the physical interface controller 17 may drive the locking start control signal lock_start_ctrl to a logic low level, and then change it to a logic high level after a predetermined period of time elapses.

The DLL may start the locking operation in response to the locking start control signal lock_start_ctrl. As the DLL starts the locking operation, the locking value lock_value is generated in the physical interface 18. When the locking operation of the DLL is completed after a predetermined period of time has elapsed, the physical interface 18 sends the physical interface controller 17 the DLL locking completion signal dll_locked_ctrl indicating the completion of the locking operation. The physical interface controller 17 transmits the DLL locking completion signal dll_locked_ctrl to the memory controller 16. Thereafter, the first semiconductor device 10 enables the interface between the first semiconductor device 10 and the second semiconductor device 20 and sends a response to the interface connection request of the second semiconductor device 20 to the second semiconductor device 20. As a result, the second semiconductor device 20 is able to access the memory device 30 via the first semiconductor device 10.

When power is off, the memory controller 16 is configured to enter the power-down mode (e.g., a low-power mode). While in the power-down mode, every internal state of the memory controller 16 is retained. Accordingly, when the memory controller 16 is subsequently powered up, control signals remain in the same state that they were in prior to entering the power-down mode. When the memory controller 16 is powered off, the physical interface 18 may be supplied with power continuously, and a clock may stop. Accordingly, the locking operation of the DLL may be needed again after powering back on. According to an exemplary embodiment, the physical interface controller 17 starts the locking operation of the DLL in the physical interface 18 after the memory access path is powered on. As a result, DLL locking may be carried out without intervention of the CPU 11.

Figure 7:
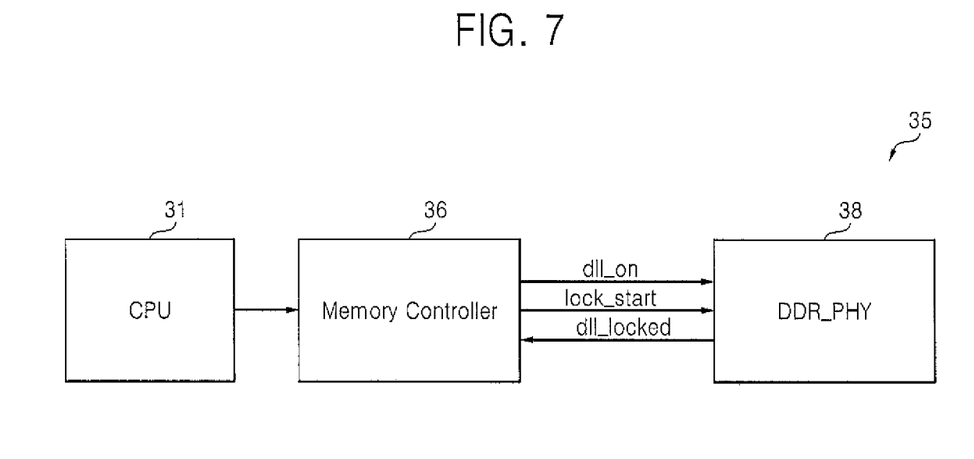
FIG. 7 is a structural block diagram of a memory interface.

FIG. 7 is a structural block diagram of a memory interface 35. Referring to FIG. 7, unlike the memory interface 15 of FIG. 5, the memory interface 35 includes a memory controller 36 and a physical interface 38, and does not include a physical interface controller. In this case, a CPU 31 configures the memory interface 35 after each power-on process in order to lock the DLL of the physical interface 38. Thus, after each power-on process, the CPU 31 is powered on again and goes through a re-booting process, which takes time and consumes power.

According to an exemplary embodiment of the inventive concept as shown in FIG. 5, when the power-off state transitions to the power-on state, the physical interface controller 17 controls signals used for DLL locking. As a result, the DLL locking is carried out without intervention of the CPU 11, and time and power consumption may be reduced.

Figure 8:
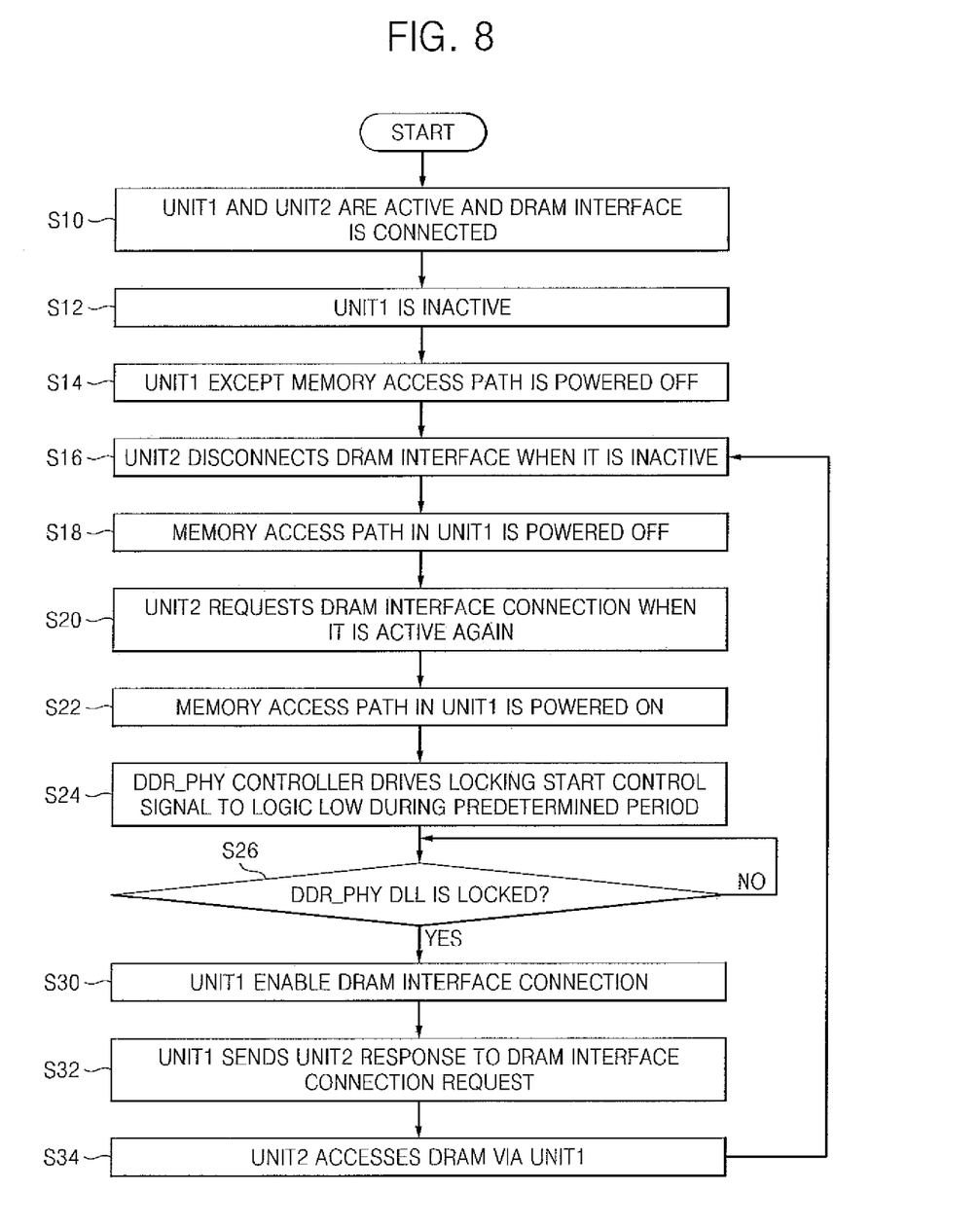
FIG. 8 is a flowchart of an operation method of an electronic system, according to an exemplary embodiment of the inventive concept.

FIG. 8 is a flowchart of an operation method of an electronic system according to an exemplary embodiment of the inventive concept. In operation S10, an interface is connected between a first semiconductor device, referred to as UNIT1 in FIG. 8, and a second semiconductor device, referred to as UNIT2 in FIG. 8, when both the first and second semiconductor devices are active.

The first semiconductor device may become inactive in operation S12. When the first semiconductor device is inactive, elements of the first semiconductor device other than elements belonging to a memory access path used for access to a memory device are powered off in operation S14. Thereafter, when the second semiconductor device becomes inactive as well, the second semiconductor device disconnects the interface established between the first and second semiconductor devices in operation S16. The memory access path within the first semiconductor device, which was previously powered on to permit access to the memory device by the second semiconductor device, is powered off in operation S18.

When the second semiconductor device transitions from an inactive state to an active state, the second semiconductor device sends a request to the first semiconductor device requesting that the interface between the first and second semiconductor devices be established again in operation S20. In operation S22, only the memory access path in the first semiconductor device is powered on without intervention of a CPU.

A physical interface controller applies a locking start control signal to a physical interface to start DLL locking in operation S24. At this time, the physical interface controller may drive the locking start control signal to a logic low level during a predetermined period.

When the DLL locking is completed in operation S26, the first semiconductor device enables the interface with the second semiconductor device in operation S30. When the DLL locking is not completed in operation S26, the first semiconductor device waits for the DLL locking to be completed.

After enabling the interface with the second semiconductor device, the first semiconductor device sends the second semiconductor device a response to the interface connection request in operation S32. The second semiconductor device then accesses the memory device via the first semiconductor device in operation S34.

Figure 9:
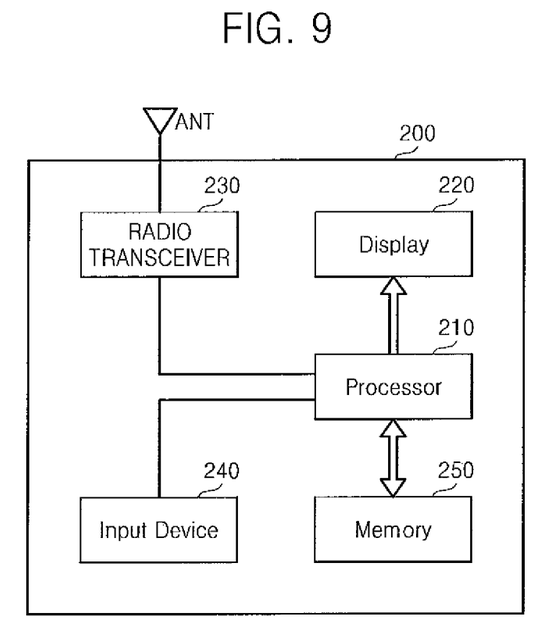
FIG. 9 is a functional block diagram of an electronic system, according to an exemplary embodiment of the inventive concept.

FIG. 9 is a functional block diagram of an electronic system 200 according to an exemplary embodiment of the inventive concept. Referring to FIG. 9, the electronic system 200 may be implemented as, for example, a cellular phone, a smart phone, a tablet personal computer (PC), a personal digital assistant (PDA) or a radio communication system, however the electronic system 200 is not limited thereto.

The electronic system 200 may include, for example, a processor 210, a display 220, a radio transceiver 230, an input device 240 and a memory 250.

The radio transceiver 230 transmits or receives radio signals through an antenna ANT. The radio transceiver 230 may convert radio signals received through the antenna ANT into signals that can be processed by the processor 210. Accordingly, the processor 210 may process the signals output from the radio transceiver 230 and transmit the processed signals to the memory 250 or the display 220.

The input device 240 enables control signals for controlling the operation of the processor 210 or data to be processed by the processor 210. The input device 240 may be implemented by a pointing device such as, for example, a touch pad or a computer mouse, a keypad, or a keyboard, however the input device 240 is not limited thereto.

The processor 210 may control the operation of the display 220 to display data output from the memory 250, data output from the radio transceiver 230, or data output from the input device 240. The processor 210, the radio transceiver 230, and the memory 250 may respectively correspond to the first semiconductor device 10, the second semiconductor device 20, and the memory device 30.

Figure 10:
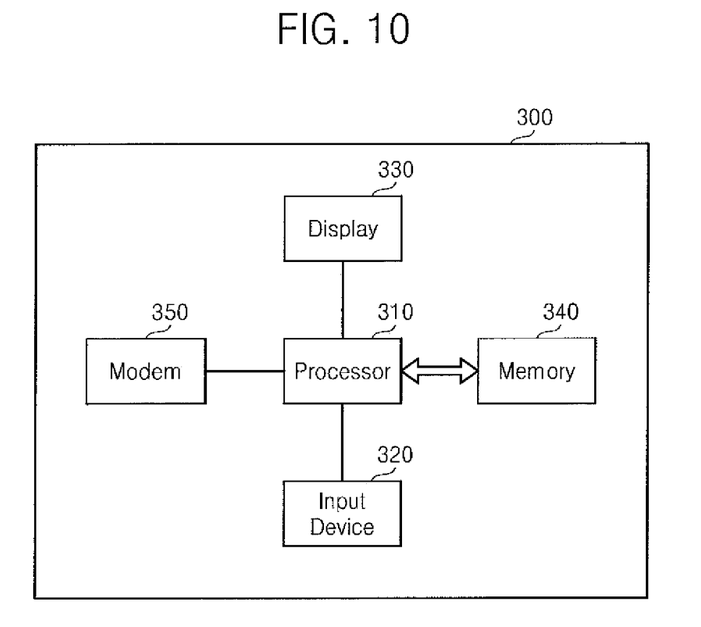
FIG. 10 is a functional block diagram of an electronic system, according to an exemplary embodiment of the inventive concept.

FIG. 10 is a functional block diagram of an electronic system 300 according to an exemplary embodiment of the inventive concept. Referring to FIG. 10, the electronic system 300 may be implemented as, for example, a personal computer (PC), a tablet PC, a netbook, an e-reader, a personal digital assistant (PDA), a portable multimedia player (PMP), an MP3 player, or an MP4 player, however the electronic system 300 is not limited thereto.

The electronic system 300 may include, for example, a processor 310, an input device 320, a display 330, a memory 340, and/or a network device (e.g., a modem 350).

The processor 310 may display data stored in the memory 340 on the display 330 according to data input through the input device 320. The input device 320 may be implemented by, for example, a pointing device such as a touch pad or a computer mouse, a keypad, or a keyboard, however the input device 320 is not limited thereto. The processor 310 may control the overall operation of the electronic system 300 and control the operation of the memory 340.

The modem 350 is a device that accesses the memory 340 via the processor 310. The modem 350 allows the electronic system 300 to be connected to a communication network so that the electronic system 300 may communicate with another electronic system (e.g., a PC). The processor 310, the modem 350, and the memory 340 may respectively correspond to the first semiconductor device 10, the second semiconductor device 20, and the memory device 30.

Figure 11:
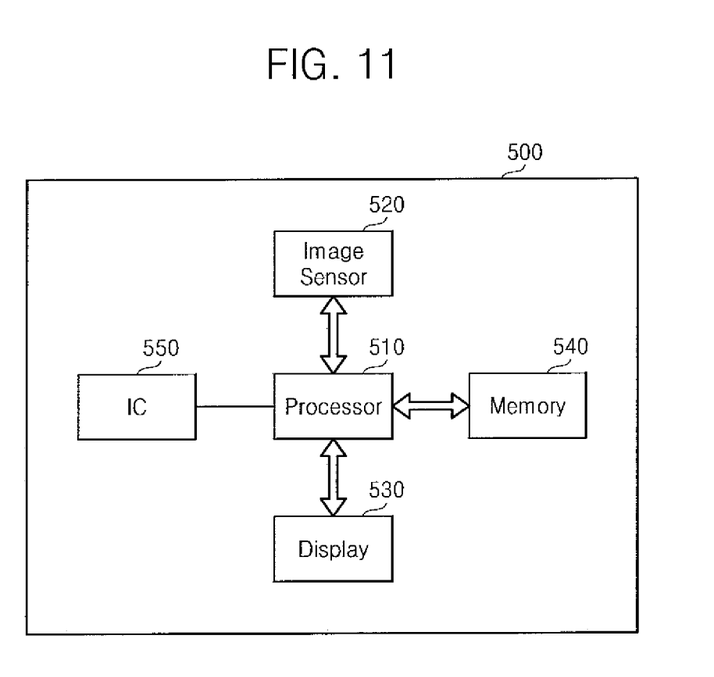
FIG. 11 is a functional block diagram of an electronic system, according to an exemplary embodiment of the inventive concept.

FIG. 11 is a functional block diagram of an electronic system 500 according to an exemplary embodiment of the inventive concept. Referring FIG. 11, the electronic system 500 may be implemented as an image processing device such as, for example, a digital camera, a cellular phone equipped with a digital camera, a smart phone equipped with a digital camera, or a tablet PC equipped with a digital camera, however, exemplary embodiments of the electronic system 500 are not limited thereto.

The electronic system 500 may include a processor 510, an image sensor 520, a display 530, a memory 540, and/or an integrated circuit (IC) 550.

The image sensor 520 converts optical images into digital signals and outputs the digital signals to the processor 510 or the memory 540. The digital signals may be controlled by the processor 510 to be displayed through the display 530 or stored in the memory 540.

The IC 550 is a device that accesses the memory 540 via the processor 510. The IC 550 allows the electronic system 500 to be connected to a communication network so that the electronic system 500 can communicate with another electronic system (e.g., a PC). The processor 510, the IC 550, and the memory 540 may respectively correspond to the first semiconductor device 10, the second semiconductor device 20, and the memory device 30.

Exemplary embodiments of the inventive concept may be embodied as computer-readable code on a computer-readable storage medium. The computer-readable storage medium is any data storage device that can store data as a program which can be thereafter read by a computer system. Examples of the computer-readable storage medium include read-only memory (ROM), random-access memory (RAM), CD-ROMs, magnetic tapes, floppy disks, and optical data storage devices.

The computer-readable storage medium can also be distributed over network coupled computer systems so that the computer-readable code is stored and executed in a distributed fashion.

It is to be understood that exemplary embodiments of the present inventive concept may be implemented in various forms of hardware, software, firmware, special purpose processors, or a combination thereof. In one embodiment, a method according to the exemplary embodiments described above may be implemented in software as an application program tangibly embodied on a computer readable storage medium or computer program product. As such, the application program is embodied on a non-transitory tangible media. The application program may be uploaded to, and executed by, a processor comprising any suitable architecture.

It should further be understood that any of the methods described herein can include an additional step of providing a system comprising distinct software modules embodied on a computer readable storage medium. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

As described above, according to exemplary embodiments of the inventive concept, power consumption may be reduced in a system providing access to a shared memory via a chip-to-chip link. In addition, a semiconductor device connected to the memory may be capable of quickly waking up without intervention of a CPU in response to the memory access request of a remote semiconductor device, thereby quickly responding to the request. As a result, an operation speed of the system may be increased.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims.

What is claimed is:

1. A method of providing access to a shared memory, comprising:

powering off a set of components of a first semiconductor device except for a subset of the set of components forming a memory access path while the first semiconductor device and a second semiconductor device are active, wherein the memory access path is a path through which the second semiconductor device accesses a memory device via the first semiconductor device;

disconnecting an interface between the first and second semiconductor devices upon the second semiconductor device becoming inactive while the first semiconductor device is inactive;

sending an interface connection request, from the second semiconductor device to the first semiconductor device, to connect the interface upon the second semiconductor device becoming active;

powering on the memory access path without intervention of a central processing unit while the set of components of the first semiconductor device except for the subset of the set of components forming the memory access path are powered off;

applying a locking start control signal configured to start delay-locked loop (DLL) locking to a physical interface in the memory access path;

enabling the interface between the first and second semiconductor devices upon completion of the DLL locking in response to the locking start control signal; and sending a response to the second semiconductor device in response to the interface connection request.

2. The method of claim 1, wherein enabling the interface between the first and second semiconductor devices comprises generating a locking completion signal upon completion of the DLL locking.

* * * * *